United States Patent [19]
Poole et al.

[11] Patent Number: 5,920,900
[45] Date of Patent: Jul. 6, 1999

[54] HASH-BASED TRANSLATION METHOD AND APPARATUS WITH MULTIPLE LEVEL COLLISION RESOLUTION

[75] Inventors: Nigel T. Poole, Natick; Barry A. Spinney, Wayland, both of Mass.

[73] Assignee: Cabletron Systems, Inc., Rochester, N.H.

[21] Appl. No.: 08/775,091

[22] Filed: Dec. 30, 1996

[51] Int. Cl.⁶ .................................................. G06F 12/10
[52] U.S. Cl. .......................................... 711/216; 711/202
[58] Field of Search .................................. 711/216, 202, 711/206; 370/392, 389

[56] References Cited

U.S. PATENT DOCUMENTS

| | | | |
|---|---|---|---|
| 4,680,700 | 7/1987 | Hester | 711/206 |
| 5,287,499 | 2/1994 | Nemes | 707/2 |
| 5,293,595 | 3/1994 | Caldarale et al. | 711/210 |
| 5,414,704 | 5/1995 | Spinney | 370/389 |
| 5,483,526 | 1/1996 | Ben-Nun et al. | 370/395 |
| 5,555,405 | 9/1996 | Griesmer et al. | 707/205 |
| 5,633,858 | 5/1997 | Chang | 370/255 |
| 5,708,659 | 1/1998 | Rostoker | 370/392 |
| 5,757,795 | 5/1998 | Schnell | 370/392 |

*Primary Examiner*—Tod R. Swann
*Assistant Examiner*—Christopher S. Chow
*Attorney, Agent, or Firm*—Wolf, Greenfield & Sacks, P.C.

[57] ABSTRACT

A translation is performed by using a programmable hashing technique on an input number to generate a hashed number. A subset of the hashed number bits are used to index a first hash table. In first hash table locations where a hash collision does not occur, the first hash table entry contains an index into an output table which contains the desired translated output number. In first hash table locations where a hash collision occurs, the first hash table entry contains a pointer to a first resolution table area in a second hash table. The first resolution table area contains entries which are indexed by additional bits selected from the hashed number in accordance with a mask field in the first hash table location. If collisions occur in the resolution table a new resolution table is created and the process is repeated. The resolution process thus proceeds in stages until all input numbers have been translated.

13 Claims, 5 Drawing Sheets

HASH-BASED TRANSLATION METHOD AND APPARATUS WITH MULTIPLE LEVEL COLLISION RESOLUTION

FIELD OF THE INVENTION

This invention relates, in general, to translation methods and apparatus using table lookup and specifically to collision resolution in hash-based lookup tables.

BACKGROUND OF THE INVENTION

Translation between data formats is a common problem in data processing systems. Often the operation of the data processing system is heavily dependent on the speed and efficiency of the translation process. For example, one common example is the translation of stored binary data into a form suitable for transmission over a data network. A data network typically consists of several nodes, at which switches are located, connected together by data transport media. A common method of transmitting data over such a network is to exchange messages between the switches, which messages comprise discrete "packets" of data. These packets can be transported over the media with one of a variety of transport techniques. In applications utilizing packetized data, data to be transported is first broken up into discrete pieces or packets which are then transmitted through the switches and reassembled at a destination. In accordance with current packet protocol, each packet generally consists of a header and an information field. The header contains the information used to transport the cell from one node to the next. The packet data is contained in the information field.

In such networks, the data source and destination are often identified by unique numerical addresses and in accordance with many popular protocols, to insure that the network can be reasonably large, the address information in the header field of such system is also often large—on the order of 5–6 bytes or 40–48 bits. A 48-bit address field can identify $2^{40}$ or about 300 trillion unique addresses. However, most networks have on the order of a few thousand different terminals so that only a small fraction of the potential address pool is actually needed.

The disparity in the potential number of addresses and the number of actual addresses causes inefficient use of resources. For example, if provisions were made to store each unique address, a large memory would be necessary, but only a few memory locations would be used to store the actual addresses. Therefore, for efficient use of resources at each local node, smaller address fields, conventionally called forwarding addresses, are used and a translation is made between the larger address field used in the packet headers and the smaller address field used within each local node.

A conventional translation method for translating addresses in packet switching systems uses a database in which the local, smaller addresses are stored. The larger addresses in the data packet headers are used to search the local database and retrieve the forwarding addresses. There are several well-known techniques for performing this search. One method is to use a binary tree search. Another method is to use a content addressable memory. Still other methods rely on hashing techniques to generate an index into the database. These address translation methods are described in U.S. Pat. Nos. 4,587,610; 4,993,937; 5,027,350 and 5,136,580.

An important design objective in packet switching networks is controlling the flow of packets so that packets will not arrive at communication links or switches at a faster rate than they can be processed and forwarded to the next destination. If the packets cannot be processed rapidly, packet buffers may become full and packet loss will occur severely reducing the efficiency of the network. As a result, binary tree searches present difficulties in such networks. For example, a forwarding address database which holds about sixteen thousand forwarding addresses (a 16K memory) requires a 14-bit address. In the worst case, with a binary searching technique, such a memory could require 14 reads in order to locate a particular address in the memory. This number of reads is prohibitive from a performance standpoint using commonly available semiconductor memories.

Content addressable memories require only one read to compare a packet address with all stored addresses. However, content addressable memories are complex and expensive and, thus, suitable only for systems in which the forwarding database is small.

Another alternative is to use a hashing technique to convert the large number of packet header addresses into a smaller number of local forwarding addresses. Conventional hashing techniques use a mathematical transformation to map each of the packet addresses into one of a set of index addresses which are used to index into the forwarding address database. Since a large number of addresses are being reduced into a much smaller number of addresses, some of the packet addresses will inevitably map into the same index address causing a "hash collision." Some technique must be used to resolve these hash collisions so that a unique index address can be generated from each packet address.

One problem with these hashing techniques is that the efficiency of the method has been heavily dependent on the hashing transformation used in the procedure. Many hashing transformation suffer from poor memory usage, low speed and large worst-case delays, thereby making them unsuitable for use in the packet switching address translation systems. In addition, many hashing techniques utilize special circuitry to resolve collisions and are thus expensive and complicated.

Still other prior art techniques use a combination of the above-described techniques to perform the required translation. For example, U.S. Pat. No. 5,414,704, the disclosure of which is hereby incorporated by reference, uses a programmable hashing technique to generate the forwarding address table indices and a binary search technique to handle hash collisions. In accordance with the disclosed method, the data packet addresses are transformed by a hash transformation into indices for a hash table. The hash table includes as each table entry, a pointer to a set of forwarding table indices arranged in a small binary tree. Hash collisions, which cause two or more data packet addresses to transform to the same hash table entry, are handled by performing a binary tree lookup to obtain a unique forwarding address table index. Since the binary tree is small (typically three levels or seven total entries) the number of reads required to traverse the tree is also small thereby significantly reducing the lookup time. A content-addressable memory (CAM) is provided to handle the cases in which more than seven data packet addresses hash to the same hash table entry.

While aforementioned combination arrangement offers a compromise in performance and cost, there are many address combinations in which the CAM must be relatively large because a significant number of data packets addresses transform to the same hash table entry. The cost of the system is therefore increased.

Accordingly, there is a need for a translation method and apparatus which efficiently uses system resources, performs well and has a lower cost than presently-available translation or lookup systems.

SUMMARY OF THE INVENTION

In accordance with the principles of the invention, a translation is performed by using a programmable hashing technique on an input number to generate a hashed number. A subset of the hashed number bits are used to index a first hash table. In first hash table locations where a hash collision does not occur, the first hash table entry contains an index into an output table which contains the desired translated output number.

In first hash table locations where a hash collision occurs, the first hash table entry contains a pointer to a first resolution table area in a second hash table. The first resolution table area contains entries which are indexed by additional bits selected from the hashed number in accordance with a mask field in the first hash table location. In the first resolution area, in each entry where a collision does not occur, the first resolution table entry contains an index into the output table which contains the desired translated output number. In each first resolution table entry where a collision does occur, the entry contains a pointer to a second resolution area in a third hash table. The second resolution table area contains entries which are indexed by still more bits selected from the hashed number in accordance with a mask field in the first resolution table location. The entries in the second resolution table may be indices into the output table or additional pointers to still further resolution tables, if hash collisions occur in the second resolution table. In this manner, new levels of resolution tables can be added using additional bits selected from the hashed number until all entries are resolved. There is no need to resort to additional circuitry or techniques to resolve hash collisions.

In accordance with one embodiment of the invention, each hashed number is stored in a hash remainder table at an address indexed by the same index which is generated to index the output table. When the index has been generated, it is used to retrieve the stored hash number which is compared to the original hash number. A match indicates that the retrieval mechanism has retrieved a valid index and the forwarding information is retrieved from the output table and returned. If no match is obtained, default forwarding information is returned.

BRIEF DESCRIPTION OF THE DRAWINGS

The above and further advantages of the invention may be better understood by referring to the following description in conjunction with the accompanying drawings and which.

DETAILED DESCRIPTION OF A PREFERRED EMBODIMENT

Figure 1:
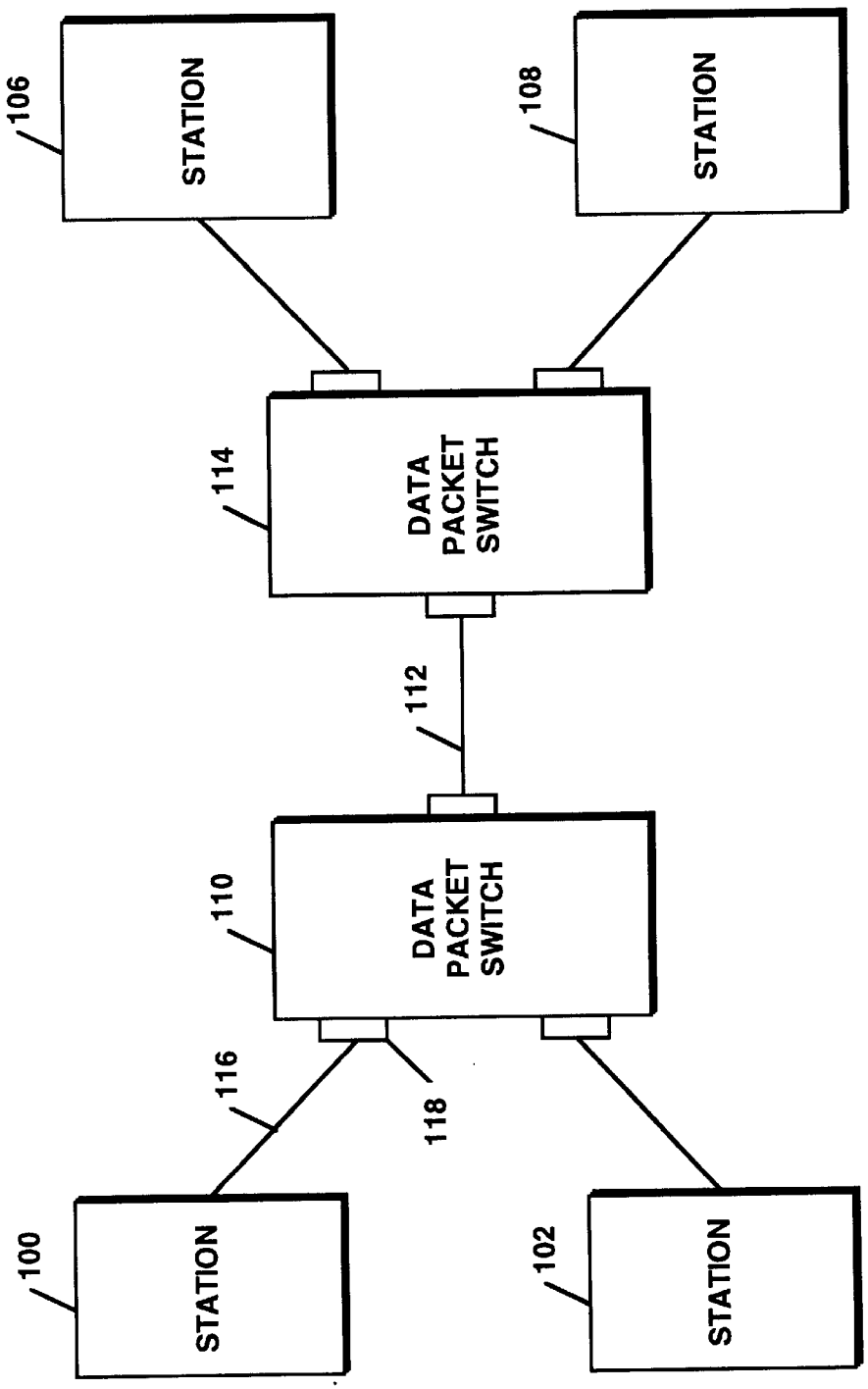
FIG. 1 is a block schematic diagram of a data packet switching network on which the inventive method and apparatus may run.

FIG. 1 illustrates, in very generalized form, a data packet local area network involving four stations 100–108, respectively, in which a translation method and apparatus constructed in accordance with the principles of the present invention can run. It should be understood that, although the invention is described in connection with a data packet switch and address translation, the inventive method and apparatus can also be used to perform other translations. In such a network, each station 100–108 contains software which breaks the data into packets and affixes an appropriate header indicating how each packet should be routed through the network. Each station also contains software which receives data packets and reassembles the packets into the completed data stream.

Stations 100 and 102 are connected to a data packet switch 110 and stations 106 and 108 are connected to switch 114. Switches 110 and 114 route packets between the stations 100–108 and control access to the network. For example, station 100 may send packets over media line 116 to media input port 118 of switch 110. Switch 110 may route data packets to a destination station, for example station 106, based on the information in each packet header. To do this packets are first switched by switch 110 onto output line 112 to switch 114. Switch 114 then routes the packets to station 106. Although only one output line 112 is shown, switch 110 may have several output lines.

Each data packet switch, for example switch 100, acts as a packet relay. The input side of the switch contains a first in-first out (FIFO) buffer queue connected to the media input port 118. Packets arrive from the incoming communication link 116 and are entered into one end of the buffer. The switching process involves examining each packet, in turn, at the other end of the buffer and determining from the routing codes in the packet header which output line should be used. The packet is then added to a FIFO buffer queue for that output line which holds packets waiting to be transmitted on the associated outgoing communication link 112.

It is important that the switching process operate efficiently because data packets can arrive at closely spaced intervals. Switch congestion occurs when either the input or output FIFO buffers fill to a predetermined level. If the congestion becomes severe enough the buffers may become completely full, in which case there is no space for incoming packets to be stored and the packets are lost. With many transmission protocols, the successful transmission of a data through the network requires successful delivery of all the packets formed from the original data and the loss of any one packet may requires the entire piece of data to be retransmitted. When a station repeatedly tries to resend the same data, the network becomes increasingly loaded as more network congestion occurs and, accordingly, the possibility that more packets will be lost increases. As a result, many packet-switched networks can operate efficiently only when there is no packet loss.

Figure 2:
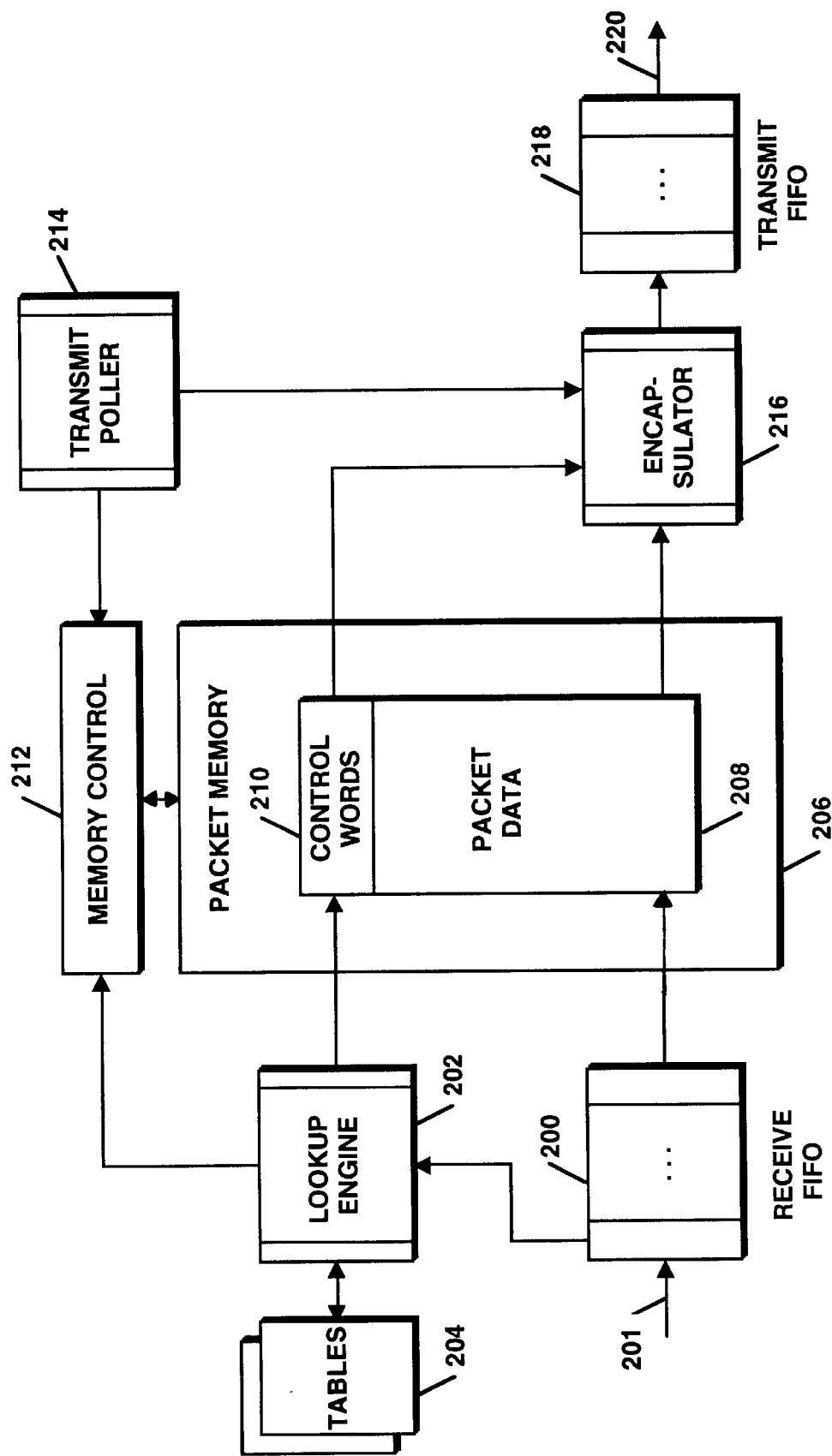
FIG. 2 is a more detailed block schematic diagram of a data packet switch which diagram illustrates the flow of data packets through the switch.

FIG. 2 illustrates, in more detail, the construction of a switch, such as switch 100 or 114. The heart of the switch is a data moving engine (DME) which includes a receive FIFO 200, a data packet memory 206, and associated memory control 212, and an output FIFO 218. Reception of data packets is controlled by lookup engine 202 operating in conjunction with memory control 212 and tables 204. Output of data packets is controlled by transmit poller and encapsulator 216. The DME is designed to move data packets between the input and output ports, 201, 220 and a local packet memory 206 and provide lookup functions on received packets for filtering and bridge forwarding.

More specifically, the movement of data between the input port 201, the output port 220 and the packet memory 206 occurs autonomously. Received packets are demultiplexed (if necessary) and put onto queues stored in the packet memory 206. These queues take the form of linked lists in the data packet memory 206. Packets waiting on queues designated as transmit queues are transmitted to the output port as the interfaces become available. To this end, the head of each output queue linked list is associated with an output port. Packets may also be received on non-transmit queues; these packets will require further processing by a data processor (not shown) and may include spanning tree packets, packets to be routed, packets requiring format translation. The processor places these latter packets on the transmit queues once they are processed, or else removes them for further local processing.

The receive FIFO 200 provides data buffering between the packet memory 206 and the input ports. One physical FIFO is provided which is logically partitioned into multiple FIFOs of which one FIFO is associated with each input port. The transmit FIFO 220 provides data buffering between the packet memory 206 and the output ports. As with the receive FIFO 200, only one physical FIFO is provided which is logically partitioned into multiple FIFOs of which one FIFO is associated with each output port.

After a packet has been received in the input port, the Lookup Engine 202 receives the header information from the input port, hashes it and uses the result to access the Hash Tables 204 stored in memory, as will be described in detail below. The result of the Hash and Lookup processes is a "forwarding value". The forwarding value is used by the memory control 212 to determine whether to queue or filter the packet and the appropriate queue or (filter counter) to use. The lookup engine 202 also generates "packet control words" 210 which are written into the packet memory 206 ahead of the packet data 208 for each packet (a single data packet is illustrated in memory 206 for clarity.)

Transmission or forwarding of the stored data packets is controlled by transmit poller 214. Transmit poller 214 is a process which polls certain queues in order to find data packets that can be transmitted. When such a data packet is found, it is dequeued and provided to the encapsulator 216. Encapsulator 216 uses the packet control words stored with the data to determine whether and how the outgoing packet must be encapsulated. For example, the packet may need some header bytes appended.

The inventive lookup process is performed by lookup engine 202 which is a process which runs in the processor of the associated switch. The lookup argument provided to the lookup engine by the input port may be a 48-bit MAC address, or other information, such as a 5-byte Protocol Identifier (PID), a 2-byte Protocol Type (PT) or a one-byte Destination Service Access Point (DSAP). The lookup engine 202 pads each lookup argument with a type code and, if necessary, zero-value bytes to make all lookup arguments 48-bits wide. The 48-bit width is merely illustrative and any other lookup argument width can also be used in accordance with the principles of the invention.

More particularly, the lookup engine classifies each input value into one of four types. Padding is applied as necessary to make the argument 48 bits wide, and a 4-bit Type code is tagged to the argument. The following Table 1 illustrates type codes and padding values used for the various lookup argument types in accordance with one illustrative embodiment:

TABLE 1

| Lookup Type | Type Code | Padding Prefix |
|---|---|---|
| MAC address | 1 | (none) |
| PID | 8 | 8D |
| PT | 9 | 9D 00 00 00 |
| DSAP | A | AD 00 00 00 00 |

The padding values are added to the left of the argument string so that the least significant bit of the padded result (bit 0) corresponds to bit 0 of the rightmost byte in the lookup argument and the most significant bit of the result (bit 47) corresponds to the most significant bit of the leftmost byte of the (padded) result. In accordance with a preferred embodiment, the specific padding prefixes are chosen to minimize the chance of collisions with assigned IEEE multicast addresses. In addition, as described below, the lookup type is stored for a later comparison which the information retrieved by the hash lookup process. Therefore, there is no possibility that addresses can be confused with protocols. The lookup argument is then hashed to provide a hashed argument, which is used to access tables 204 to perform the inventive lookup process.

Tables 204 are sized and built at system initialization or later during operation whenever the network is reconfigured by adding stations or switches. They consist of three hash tables, and a hash remainder table. At system initialization time, the number and distribution of initial system addresses are known so that the hash and remainder tables can be constructed. Also at this time, a unique forwarding value is selected for each address in the address set which forwarding value will be used to route the packet through the switch. These forwarding values are stored in a forwarding table which is indexed by a forwarding index. Later when stations or ports are added or deleted, the corresponding addresses are added or deleted and tables 204 are recomputed.

As previously mentioned, the goal is to provide a reduction in the number of potential addresses represented by a 48-bit data packet address field to a much smaller number of addresses, typically represented by a 12 to 16 bit address field. In accordance with a preferred embodiment, the reduced address size, and, accordingly, the size of the hash tables can be selected programmatically. Theoretically, it would be possible to reduce the size of the 48-bit address by simply using a subset of the bits, for example, the least significant 12–16 bits. However, practically, the addresses often contain sequences in certain unpredictable bit positions that make address compression by simple bit field extraction unreliable.

Therefore, the lookup tables are built with a programmable randomizing function, called a hash function, designed to generate a small number (less than 64K) of indices corresponding to a set of (up to 64K) lookup arguments. Ideally, the mapping from arguments to indices is one-to-one, but a small number of many-to-one mappings can be tolerated. The hash function converts the 48-bit input argument into a new 48-bit output argument, called the hashed argument, using a process based on polynomial multiplication and division. Specifically, the bits of the input argument (either 1 or 0) are considered to represent the coefficients of an order-47 polynomial in x; if this is called A(x), then:

$$A(x) = a_{47}x^{47} + a_{46}x^{46} + \ldots + a_2x^2 + a_1x + a_0$$

where the coefficients $a_0$–$a_{47}$ are the bit values of the 48-bit input argument. In accordance with the hash function, this input polynomial is multiplied by a programmable hash multiplier which is stored in memory. The hash multiplier M(x) is represented by the polynomial:

$$M(x) = m_{47} \cdot x^{47} + m_{46} \cdot x^{46} + \ldots + m_2 \cdot x^2 + m_0$$

The multiplication of the polynomials is done using modulo-2 addition; this yields an order-94 polynomial with coefficients that are also 0 or 1. This product is finally divided by a generator polynomial G(x), of fixed value given by:

$$G(x) = x^{48} + x^{36} + x^{25} + x^{10} + 1$$

The division is again carried out using modulo-2 addition. The division yields a quotient Q(x), which is a polynomial of order 46, and a remainder R(x) which is a polynomial of order 47. The operands are related by the equation:

$$A(x) * M(x) = Q(x) + R(x) * G(x)$$

The generator polynomial is chosen such that for any given multiplier polynomial (except 0), there is one-to-one mapping between the set of all values of A(x) and the corresponding set of all values R(x). The quotient Q(x) can therefore be discarded, as any value A(x) is derivable from its corresponding R(x). By choosing a suitable value for M(x), any given bounded set of lookup arguments (a subset of all values of A(x)) can be mapped onto a set of hashed arguments (a subset of all values of R(x)) with high likelihood of uniqueness in the low order 16bits (maybe as few as 12 bits) of R(x). Statistical trials have shown that a random value M(x) is often sufficient, with retries beyond two attempts being very unlikely.

Since the multiplier polynomial M(x) can be programmatically selected, it can be changed and the hash table rebuilt during operation of the system if it is found that a large number of hash collisions is occurring with a particular set of addresses. This avoids problems which are often encountered with fixed hash functions and certain address sets. In order to improve performance, the multiplier polynomial should be selected to minimize the number of collisions and the hash table size should be selected so that it is in sparsely populated (for example, the hash table size may be on the order of four times larger than the number of address entries).

A first hash table is then constructed by first selecting the number of bits in the reduced address field which determines the size of the first hash table and the width of the first hash table words (each word has a width equal to the number of bits in the hash index plus one for a collision flag.) The first hash table is next initialized with a zero in each entry. Each address is then hashed in accordance with the hash function described above to generate a hashed argument. The hashed argument is then used as an index into the first hash table.

Figure 3A:
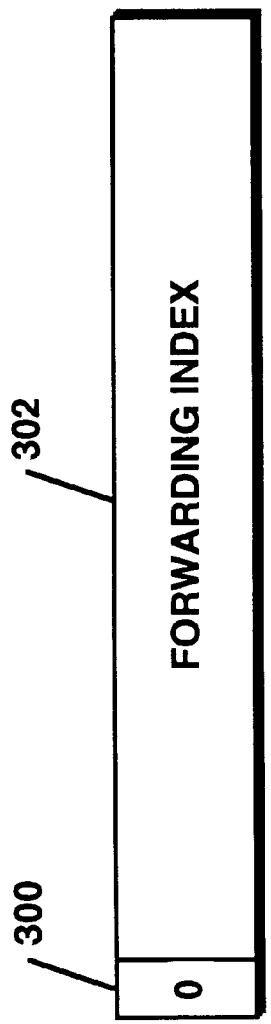
FIGS. 3A and 3B are schematic diagrams illustrating the data format in the three lookup hash tables in the case of no collision and in the case of a collision, respectively.

If the indexed location is empty, the zero entry is replaced by a data entry shown in FIG. 3A. This entry has the most significant bit 300 assigned as a "collision flag" which is set to "0". The remaining bits are assigned to the unique forwarding index which is selected as previously described. In this case the complete hashed argument and the type code are also entered in the hash remainder table at a location indexed by the unique forwarding index.

Figure 3B:
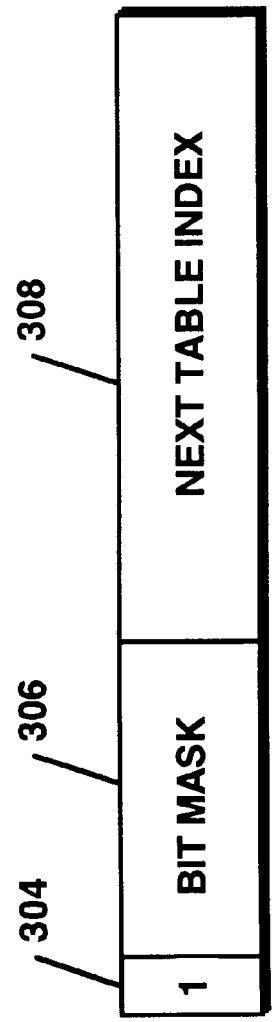

Alternatively, if a forwarding index is already present in the indexed location, the entry illustrated in FIG. 3B is made at the indexed location. In this entry, the collision flag 304 is set to "1" and the stored forwarding value is replaced by a collision entry. The collision entry comprises a bit mask field 306 and a next table index 308. The collision entry will instruct the lookup engine 202 to use more bits from the hashed argument, in conjunction with resolution areas in the additional hash tables 2 or 3 to resolve the collision.

The bit mask field is a 4-bit mask number which specifies one of sixteen functions which will be used to create a new 14-bit resolution table index from the 12-bit next table field and specified extra bits of the hashed argument when the lookup function is performed. This new resolution table index will be used to access a resolution table in either the second or third hash table to resolve the collision. The definition of the sixteen possible functions is shown in Table 2 below:

TABLE 2

| Mask No. | Hash Table | Bit Mask | Shift Amount | Resolution Table Index |
|---|---|---|---|---|
| 0000 | 2 | 00000011 | 2 | NextTableIndex & "XX" |
| 0001 | 2 | 00000101 | 3 | NextTableIndex & "XX" |
| 0010 | 2 | 00000110 | 3 | NextTableIndex & "XX" |
| 0011 | 2 | 00001001 | 4 | NextTableIndex & "XX" |
| 0100 | 2 | 00001010 | 4 | NextTableIndex & "XX" |
| 0101 | 2 | 00001100 | 4 | NextTableIndex & "XX" |
| 0110 | 2 | 00010001 | 5 | NextTableIndex & "XX" |
| 0111 | 2 | 00010010 | 5 | NextTableIndex & "XX" |
| 1000 | 2 | 00010100 | 5 | NextTableIndex & "XX" |
| 1001 | 2 | 00011000 | 5 | NextTableIndex & "XX" |
| 1010 | 3 | 00001111 | 4 | NextTableIndex (11..2) & "XXXX" |
| 1011 | 3 | 00000110 | 5 | NextTableIndex (11..2) & "XXXX" |
| 1100 | 3 | 00111100 | 6 | NextTableIndex (11..2) & "XXXX" |
| 1101 | 3 | 01111000 | 7 | NextTableIndex (11..2) & "XXXX" |
| 1110 | 3 | 11110000 | 8 | NextTableIndex (11..2) & "XXXX" |
| 1111 | 3 | 11111111 | 8 | NextTableIndex (11..6) & "XXXXXXXX" |

In this table, the values in the column titled "Hash Table" indicates whether the resolution table used to resolve the collision is part of the second hash table or part of the third hash table. The values in the column titled "Bit Mask" is an abstract mask that indicates which bits are to be selected from the low-order 8 bits of the shifted hashed argument. The "Shift Amount" column indicates how many bit positions to shift to the right the hashed argument after the bit mask is applied and bits to be used in the present resolution stage are selected. The shifting operation causes new bits of the hashed argument to be used during each stage of the resolution process. Finally, the column entitled "Resolution Table Index" indicates how to form the index into the resolution table by concatenating (indicated by the "&" symbol) the Next Table Index bits from the collision entry with the bits selected from the shifted hash argument (indicated by "X"s.)

In order to select the bit mask number, the set of addresses is examined to determine which of the bits in the upper 16 bits is most likely to change and a mask number is selected for which the corresponding bit mask selects those bits. This mask number is inserted in the mask number field of the collision entry. Then, a resolution table is created in the second or third hash tables in accordance with Table 2 above depending on the mask number selected. Resolution tables in the second hash table always have four entries and resolution tables in the third hash table always have either sixteen or 256 entries. The upper 12 bits of the resolution table base address are put into the Next Table Index Field of the collision entry. The mask is applied to the upper bits of the hashed address to determine the entry position in the newly created resolution table and entry as illustrated in FIG. 3A is inserted into the table indicating the forwarding address.

Operation continues in this fashion. If a collision is detected in the second resolution table, then the forwarding address entry illustrated in FIG. 3A is replaced by a collision entry as shown in FIG. 3B and a new resolution table is created. The operation continues in this manner until all addresses have been processed.

Figure 4:
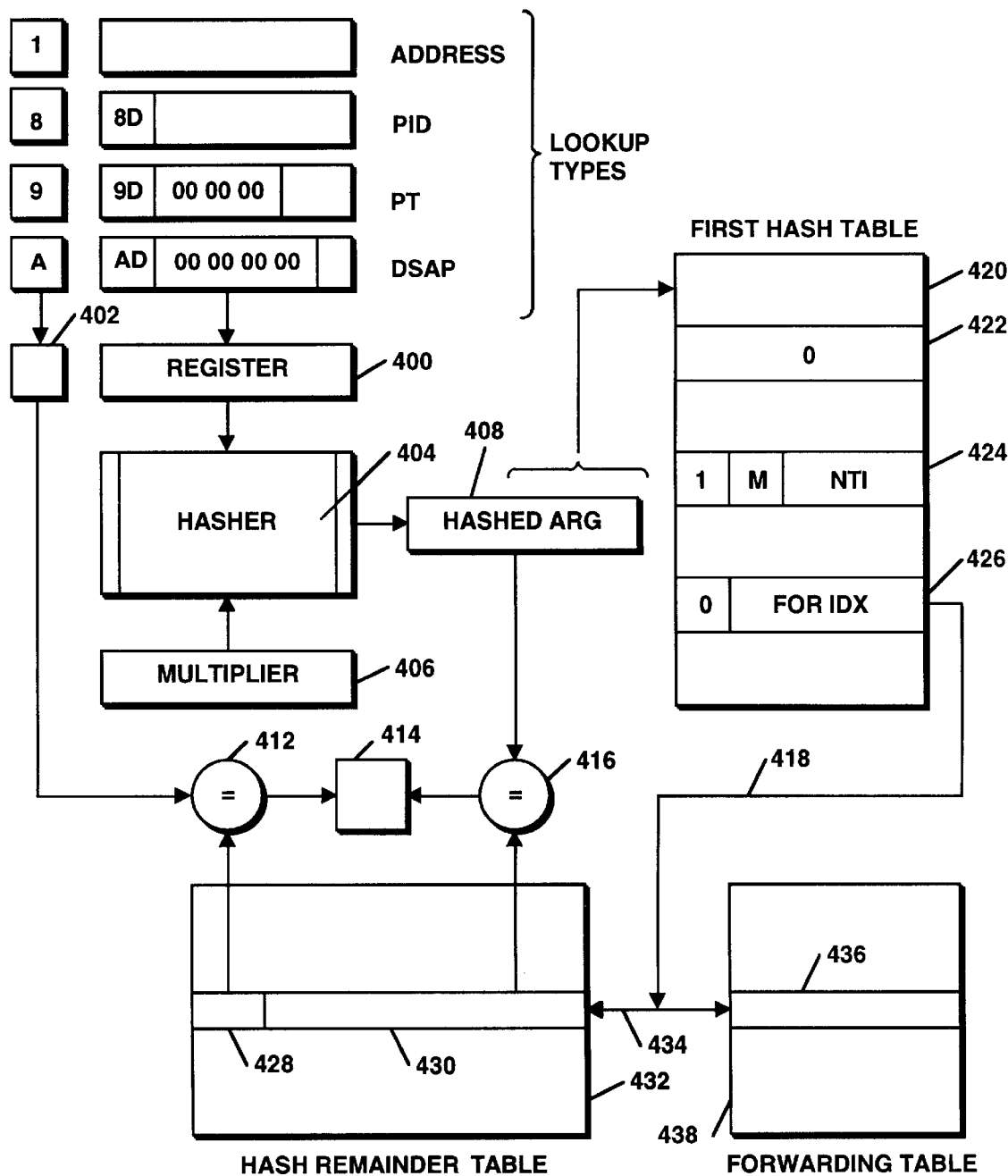
FIG. 4 is a schematic diagram illustrating a translation process conducted in accordance with the principles of the present invention when no hash collision occurs.

FIG. 4 illustrates the basic translation process which occurs when no collisions are detected. As previously mentioned there are four basic types of address information on which to perform a lookup operation. In the Figure, the address information is assumed to be 48 bits wide. This address information is loaded into register 400. A four bit type code is loaded into register 402 for a comparison as will be described in detail below.

The address information in register 400 and a multiplier M(x), discussed above and stored in register 406, are provided to a hasher process which generates a hashed argument in accordance with the technique as described above. The hashed argument is stored in register 408.

The lower 12 to 16 bits of the hashed argument in register 408 are used as a hash index to access the first hash table 420 as indicated by arrow 410. If the value zero (as initialized by the user and indicated, for example, by entry 422) is stored at the location identified by the hash index, then the forwarding index is not stored in the hash tables. Conversely, if the first hash table entry is non-zero (for example, entries 424 and 426), then it is possible (though not definite) that the forwarding index is stored in the hash tables.

More specifically, if the hash index identifies a non-zero entry from the first hash table which indicates no collision (the collision flag is '0', as indicated by entry 426), then a possible forwarding index can be retrieved from the first hash table as illustrated by arrow 418. Since many addresses alias to the same hash index, the forwarding index is used to access the hash remainder table, as indicated by arrow 434, and retrieve the type code 428 and hashed value of the address 430 previously stored at the location accessed by the retrieved forwarding index. The retrieved type code is compared in comparator 412 to the type code stored in register 402. The retrieved hashed argument is compared to the hashed argument stored in register 408 by comparator 416. The outputs of comparators 412 and 416 are provided to a decision process 414. If the hash remainder table entries 428 and 430 and the type code in register 402 and the hashed argument in register 408 are equal, the decision process 414 uses the retrieved forwarding index on line 434 to access a forwarding table 438 to retrieve a forwarding value. The forwarding value is used, as previously discussed, to route the data packet through the packet switch. Alternatively, if the comparators 412 and 416 do not both indicate a match, an alias has been found and a default index is returned.

If the hash index identifies a collision entry in the first hash table as illustrated by entry 424 in which the collision flag is "1", then further processing must be performed to resolve a collision caused when two or more different addresses generate the same hash index.

Figure 5:
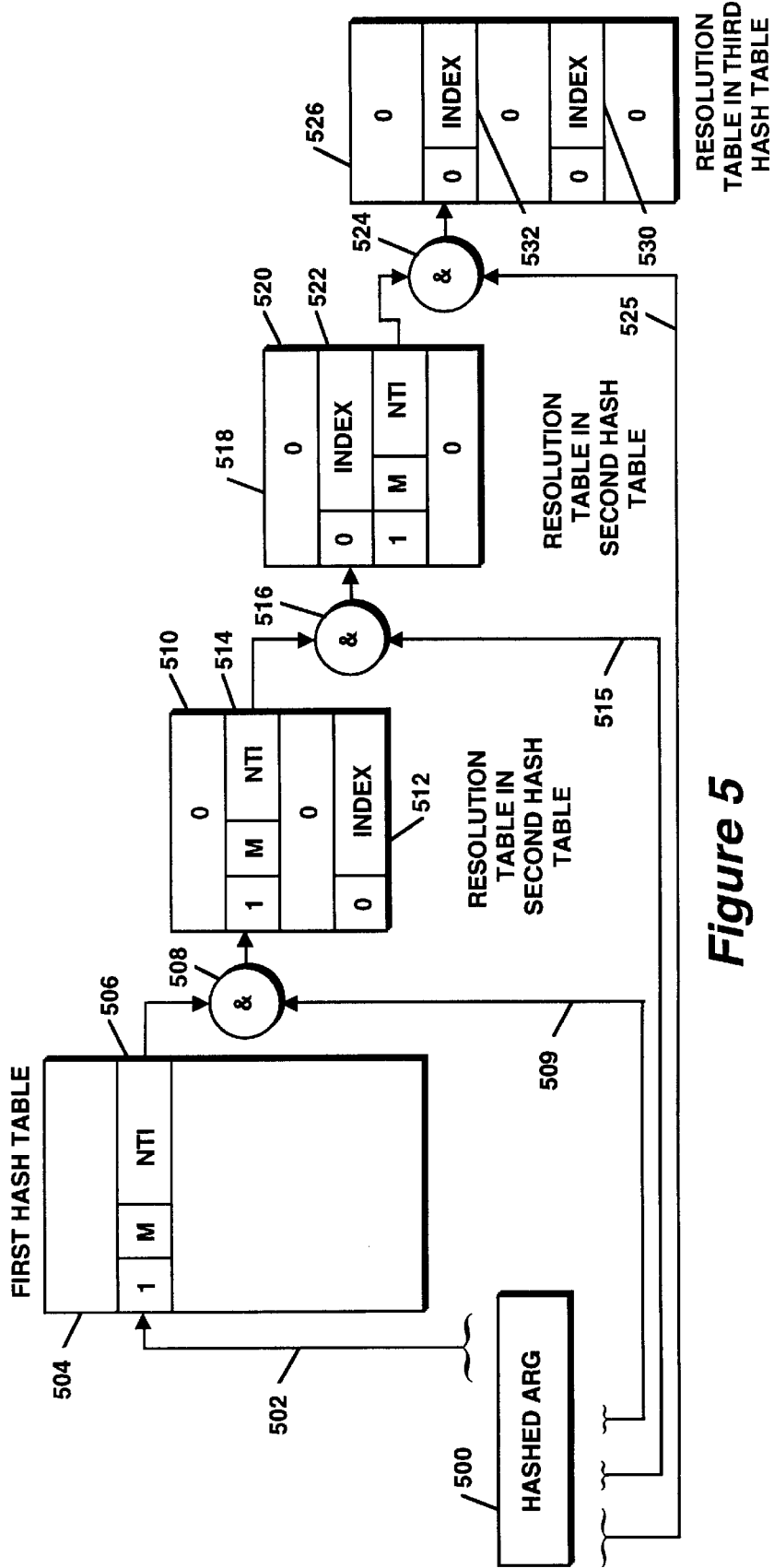
FIG. 5 is a schematic diagram illustrating translation processing in accordance with the principles of the present invention when a hash collision occurs.

FIG. 5 illustrates collision processing performed in accordance with the principles of the present invention. As shown in FIG. 5, resolution tables in the second and third hash tables are used to resolve collisions until forwarding indexes are retrieved for all addresses. The resolution process proceeds in stages. At each stage in the collision resolution process additional bits from the hashed argument are used in combination with an index stored in the collision entry to access a resolution table. This process is repeated until a resolution is obtained.

More specifically, a hash index formed of the 12–16 least significant bits of the hashed argument 500 (stored in register 408 in FIG. 4) is applied to the first hash table 504 as previously discussed. In the illustrative example shown in FIG. 5, four addresses collide, or generate hashed arguments which index the same entry, in the first hash table 504. Accordingly, when the first hash table was generated as discussed above, a collision entry 506 has been made in the entry indexed by the hash index.

The collision entry 506 in the first hash table 504 contains a next table index (NTI) which points to a first resolution table 510 located in the second hash table address space. A mask field (indicated by 'M') in the collision entry 506 describes how to create an offset into the first resolution table 510 by using two bits from the next 2, 3, 4 or 5 higher order bits (31 . . . 16) of the hashed argument 500. As previously mentioned, the bit mask indicated which of the next 2–5 should be selected. The bits selected by the bit mask as indicated by arrow 509 are concatenated with the NTI as indicated by concatenator 508 to provide an index into the resolution table 510. After the index is generated the hashed argument in register 408 is shifted so that new bits of the hashed argument will be used in further stages of the resolution process.

As previously mentioned, all second hash table resolution tables have four entries, whose formats are identical to the first hash table entry formats illustrated in FIGS. 3A and 3B. Using the two bits selected by the bit mask M in the collision entry 506, in the illustrative example, three addresses still collide in the first resolution table 510. In particular, the three addresses index to entry 514. One address indexes to entry 512 and is accordingly, collision free. Therefore entry 512 contains a forwarding index. The translation process will check for a match in the hash remainder table using this forwarding index (if the address is accessed) as discussed above with respect to FIG. 4.

The three colliding addresses require another resolution table 518 to be created. In the illustrative example, another resolution table located in the second hash table address space is used. Because there is a collision in the first resolution table, the table entry will have a collision entry 514 of the format illustrated in FIG. 3B entered at the time the table is created. The bit mask in entry 514 specifies a further two bits from the next higher order 2 to 5 bits in the hashed argument that are to be used to index this second resolution table.

The selected bits as indicated by arrow 515, are concatenated by concatenator 516 with the next table index in entry 514 to access the second resolution table 518.

In this case, there are still two colliding addresses in the second resolution table 518 and one entry 520 is collision free. The collision free entry 520 is processes as described above in connection with the first resolution table. The entry 522 to which the two remaining addresses index is arranged to point to a third resolution table 526. This third resolution table 526 is located in the third hash table address space and contains either sixteen entries or 256 entries, which are indexed by 4 or 8 bits selected from a field of 4 to 8 higher order bits in the hashed argument. As with the previous resolution stages, the bit mask M in the collision entry 522 specifies which bits on the next least significant bits of the hashed argument are to be used to access the third resolution table 526. The selected bits as indicated by arrow 525 are concatenated by concatenator 524 and used to index the third resolution table 526.

In the illustrative example, the remaining two addresses are resolved in the third resolution table 526 as indicated by entries 530 and 532. Accordingly, each of these entries contains a forwarding index which is processed as previously described.

The amount of resolution processing which must be performed in accordance with the principles of the invention depends on the initial address set, the hashing method used and the size of the first hash table. Consequently, the values for the hash multiplier and the first hash table size should be selected so that collisions in the first hash table are minimized. It is also preferred to make the size of the hash table significantly larger (for example, four times larger) than the number of expected entries in order to spread the entries over the address space and minimize the possibility of collisions.

While the invention has been shown and described above with respect to various preferred embodiments, it will apparent that the foregoing and other changes of the form and detail may be made therein by one skilled in the art without departing from the spirit and scope of the invention. These and other obvious modifications are intended to be covered by the following claims.

What is claimed is:

1. Apparatus for resolving a hash collision which occurs in a hash table when two input numbers generate a hashed value which is used to access a single location in the hash table, the apparatus comprising:

at least one resolution table containing a plurality of entries;

a mechanism for inserting a collision entry into the single location and into each resolution table entry where a collision occurs, the collision entry containing a bit mask and a pointer to a resolution table; and an index generator responsive to each collision entry and to portions of the hashed value for accessing the one resolution table pointed to by the each collision entry.

2. Apparatus according to claim 1 wherein the bit mask in each collision entry comprises a mechanism for selecting the portions of the hashed value used by the index generator.

3. Apparatus according to claim 1 wherein the index generator combines the collision entry pointer with the portions of the hashed value to access the one resolution table.

4. Apparatus according to claim 1 wherein part of the hashed value is used to access the single location in the hash table and the portions of the hashed value used by the index generator are different from the part of the hashed value used to access the single location in the hash table.

5. A method for resolving a hash collision which occurs in a hash table when two input numbers generate a hashed value which is used to access a single location in the hash table, the method comprising the steps of:

A. creating at least one resolution table containing a plurality of entries;

B. inserting a collision entry into the single location and into each resolution table entry where a collision occurs, the collision entry containing a bit mask and a pointer to a resolution table; and C. accessing the one resolution table pointed to by the each collision entry using each collision entry and portions of the hashed value.

6. A method according to claim 5 wherein step C comprises the step of:

C1. using the bit mask in each collision entry to select the portions of the hashed value for accessing the one resolution table.

7. A method according to claim 5 wherein step C further comprises the step of:

C2. combining the collision entry pointer with the portions of the hashed value to access the one resolution table.

8. A method according to claim 5 wherein step C comprises the step of:

C3. using a part of the hashed value to access the single location in the hash table which is different from the portions of the hashed value used to access the resolution table.

9. Translation apparatus for translating a plurality of input numbers into a plurality of output numbers, the apparatus comprising:

a hasher responsive to each of the plurality of input numbers for generating a hashed argument corresponding to the each input number, the hashed number having a plurality of bits;

a first hash table containing a plurality of entries, each of the plurality of entries where a hash collision does not occur containing an index into an output table which contains the output number and each of the plurality of entries where a hash collision occurs containing a bit mask and a pointer to a next resolution table;

at least one resolution table containing a plurality of entries, each of the plurality of entries where a hash collision does not occur containing an index into the output table which contains the output number and each of the plurality of entries where a hash collision occurs containing a bit mask and a pointer to a next resolution table;

a first index generator entries responsive to a subset of the hashed argument bits for accessing the first hash table; and a second index generator responsive to a collision entry and to hashed argument bits not in the hashed argument bit subset for accessing the at least one resolution table.

10. A computer program product for resolving a hash collision which occurs in a hash table stored in a memory when two input numbers generate a hashed value which is used to access a single location in the hash table, the computer program product comprising a computer usable medium having computer readable program code thereon, the program code including:

program code for creating at least one resolution table containing a plurality of entries in the memory;

program code for inserting a collision entry into the single location and into each resolution table entry where a collision occurs, the collision entry containing a bit mask and a pointer to a resolution table; and program code responsive to each collision entry and to portions of the hashed value for accessing the one resolution table pointed to by the each collision entry.

11. A computer program product according to claim 10 further comprising program code for using the bit mask in each collision entry to select the portions of the hashed value used by the index generator.

12. A computer program product according to claim 10 wherein the program code for accessing the one resolution table comprises program code for combining the collision entry pointer with the portions of the hashed value to access the one resolution table.

13. A computer program product according to claim 10 wherein part of the hashed value is used to access the single location in the hash table and the portions of the hashed value used by the program code for accessing the one resolution table are different from the part of the hashed value used to access the single location in the hash table.

* * * * *